Figure 1:
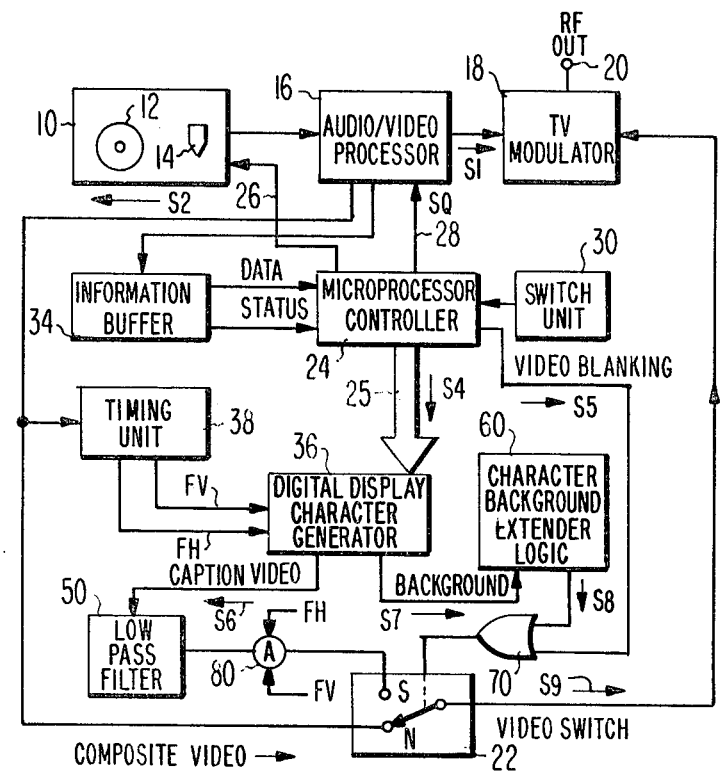

United States Patent [19]

Chen et al.

[11] Patent Number: 4,477,841
[45] Date of Patent: Oct. 16, 1984

[54] VIDEO PLAYER WITH CAPTION GENERATOR HAVING CHARACTER BACKGROUND PROVISIONS

[75] Inventors: Thomas Y. Chen, East Brunswick; Walter G. Gibson, Princeton, both of N.J.

[73] Assignee: RCA Corporation, New York, N.Y.

[21] Appl. No.: 309,192

[22] Filed: Oct. 6, 1981

[51] Int. Cl.³ .............................................. H04N 5/76
[52] U.S. Cl. ..................................... 358/335; 358/342
[58] Field of Search .............................. 358/335–348, 358/310–334; 360/33.1, 37.1

[56] References Cited

U.S. PATENT DOCUMENTS 3,984,828 10/1976 Beyers, Jr. .................. 340/324 AD
4,122,488 10/1978 Mikado ............................... 358/19

Primary Examiner—Raymond F. Cardillo, Jr.
Attorney, Agent, or Firm—E. M. Whitacre; P. J. Rasmussen; R. G. Coalter

[57] ABSTRACT

A filter limits the bandwidth of a caption video signal in a video disc player to minimize color beats when the caption signal is displayed along with a picture video signal on a television receiver. The filter delay, which would otherwise cause offset between the caption and an associated background signal used to enhance visibility of the caption, is compensated for by extending the time duration of each occurrence of the background signal by a multiple of the filter delay.

9 Claims, 7 Drawing Figures

VIDEO PLAYER WITH CAPTION GENERATOR HAVING CHARACTER BACKGROUND PROVISIONS

This invention relates to video players and particularly to video disc or tape players of the type having a caption generator for producing numeric or alphanumeric characters for simultaneous display along with a recovered "picture" signal on the screen of a raster scan display device such as a video monitor or television receiver and in which the character visibility is enhanced by means of background shading or bordering.

In video disc or tape players, particularly of the remotely controlled variety, it is desirable to provide a display of information such as playing time, video frame numbers or other information recovered from the tape or disc or otherwise generated within the player. One approach that may be utilized involves displaying the information as numeric or alphanumeric characters on the screen of a television receiver or monitor. Where the character information is displayed simultaneously with a "picture" recovered from the record medium (tape or disc), the resultant image may be subject to appearing washed out when a character is generated in a region of the displayed picture image having brightness and/or color similar to that of the displayed character.

It is known that one may enhance the visibility of captions displayed simultaneously with a picture by providing a contrasting background in the immediate region of the caption. Such a background may be in the form of a "box" which completely surrounds each character or character grouping or it may be in the form of shading or edging of each individual character. As an example, in U.S. Pat. No. 3,984,828 of Beyers Jr., a character generator is shown in a television receiver application wherein a caption background signal and a caption video signal are generated. The caption video signal is added to the picture video signal for display on a kinescope and the background signal (symmetrically disposed with respect to borders of the caption video signal) is used for blanking of the picture video signal whereby caption characters having contrasting black borders appear in the displayed picture.

The present invention resides in part in recognition of a new problem which can arise in video disc or tape players having caption generators which provide contrasting background (shading or boxing) for enhancing the visibility of characters displayed with a recovered composite (picture) video signal. More specifically, conventional character generators are digital devices which produce character dots or picture elements (pixels) having edges with very fast rise times as compared with a composite "picture" video signal. The process in a video player of interleaving the wide bandwidth caption signal with the narrower bandwidth video signal by time division multiplexing, modulating an RF carrier with the resultant signal and then demodulating the RF carrier in a TV receiver can result in objectional "cross color" or "color beat" effects in the displayed image. This problem is not likely to occur where the caption generator is in a television receiver because the combined or multiplexed signal format does not exist and the caption does not pass through the color demodulator, the caption being applied to the kinescope directly. It is believed that the cross color effect may be due to harmonics of the wideband caption video signal falling within the chrominance signal passband of the receiver.

If one were aware of this new problem and also of its probable cause, one might consider limiting the caption video signal bandwidth by suitable means, for example, such as a low pass filter. This can lead to yet another problem. Specifically, limiting the bandwidth of the caption video signal will result in a delay relative to the background signal which will cause the background signal to be asymmetrical with respect to the character pixels when displayed on the television receiver. Another possibility would be to separately filter the background and the caption signals but this approach is unsatisfactory because it requires two filters and it may degrade the performance of the video switch (controlled by the background signal) which provides the function of interleaving (time division multiplexing) the caption and picture video signals. Yet another solution which might be considered would be to filter the interleaved caption and picture signals. This, however, can lead to a loss of resolution of the picture signal which is undesirable.

Accordingly, it is an object of the present invention to provide a video player apparatus in which the problem of cross color or color beats is substantially reduced and in which the caption character of a displayed image remains symmetrically disposed within a background area of contrasting brightness.

A video disc player embodying the invention includes signal recovery means for providing a composite video signal and character generator means for providing a caption video signal and a caption background signal. A filter means, coupled to the generator means and having a characteristic delay, limits the bandwidth of the caption video signal to a predetermined value. A circuit means, coupled to the generator means, extends the background signal for a predetermined time subsequent to each occurrence thereof, the predetermined time corresponding to a multiple of the characteristic delay. Switch means, responsive to the extended background signal, combines the composite video signal with the bandwidth limited caption video signal in interleaved fashion to form a resultant signal for application to an output means.

Figure 2:
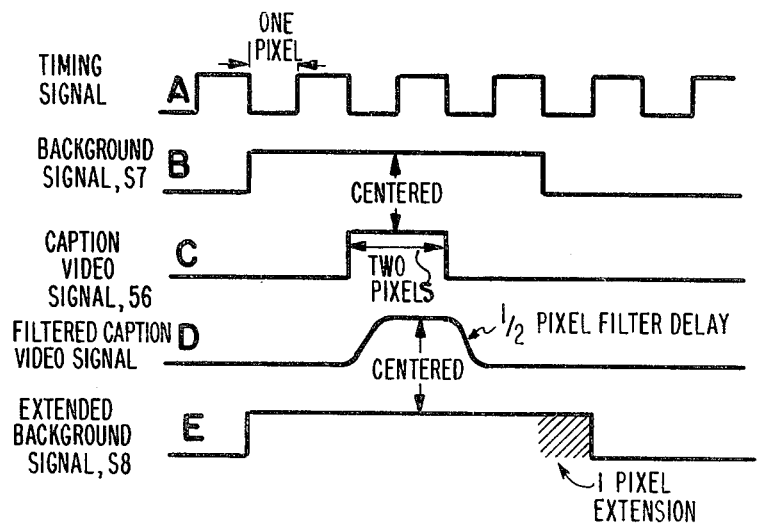
Figure 3:
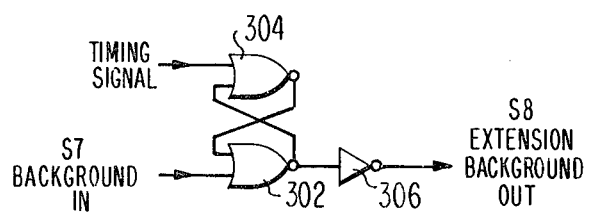

In the drawings:

FIG. 1 is a block diagram of a video disc player embodying the invention;

FIG. 2, consisting of A-E, is a waveform diagram illustrating certain aspects of operation of the player of FIG. 1; and FIG. 3 is a diagram of a character background extender logic circuit suitable for use in the player of FIG. 1.

The player 10 of FIG. 1 includes a turntable mechanism for rotating a video disc record 12 at a predetermined substantially constant angular velocity and a pickup transducer 14 for recovering information signals from the disc. Illustratively, it will be assumed that the player is intended for use with records in which information is stored in the form of topological variations and recovered by sensing capacitance variations between a stylus in transducer 14 and the record 12. The output of transducer 14 is applied to a capacitance-to-voltage converter in player 10 which produces an FM output signal voltage representative of the recorded information. Such records and suitable circuits for implementing capacitance-to-voltage conversion are well known. See, for example, U.S. Pat. No. 3,783,196 entitled "HIGH DENSITY CAPACITIVE INFORMA- TION RECORDS AND PLAYBACK APPARATUS THEREFORE" which issued to T. O. Stanley, Jan. 1, 1974; U.S. Pat. No. 3,842,194 entitled "INFORMATION RECORDS AND RECORDING/PLAYBACK SYSTEMS THEREFOR" which issued to J. K. Clemens, Oct. 15, 1974; and U.S. Pat. No. 4,080,625 entitled "PICKUP CIRCUITRY FOR A VIDEO DISC PLAYER WITH PRINTED CIRCUIT BOARD" which issued to Kawamoto et al., Mar. 21, 1978.

The FM signal is applied to an audio/video processor 16 which produces a baseband audio output signal, S1, and a baseband composite video output signal, S2, inclusive of horizontal synchronizing or "timing" pulses (HS) and vertical synchronizing or "timing" pulses (VS). Processor 16 also has an input for receiving a squelch signal (SQ) for inhibiting or muting the audio and composite video output signals when the squelch signal is present. Pyles et al., in U.S. Pat. No. 4,286,290 entitled "FAST RECOVERY SQUELCH CIRCUIT FOR A VIDEO DISC PLAYER" which issued Aug. 25, 1981, disclose a suitable implementation of processor 16 which includes timebase error correction circuitry and format conversion circuitry for converting the recovered video signal from the "buried subcarrier format" proposed by Pritchard in U.S. Pat. No. 3,872,498 to NTSC format. The advantages of buried subcarrier encoding of video disc records are well known and records recorded in such a format are commercially available, for example, from RCA Corporation. Carnt et al., in U.S. Pat. No. 4,200,881 describe processors suitable for recording and reproducing composite video signals of PAL format.

The baseband audio signal S1 produced by processor 16 is applied to the sound carrier modulation input of a TV modulator 18 which has an RF output terminal 20 for connection to the antenna input terminal of a television receiver (not shown). The composite baseband video signal S2 is coupled via a video switch 22 (when the switch is in its normal position, N, as shown) to the video modulation input terminal of modulator 18 which produces modulated picture and sound carrier waves on a selected TV channel for reception by the receiver. An integrated circuit suitable for use as modulator 18 is the type LM 1889 available, for example, from National Semiconductor, Inc.

A controller 24 (preferably microprocessor based as opposed to being implemented with random logic) provides various supervisory and information display control functions. The control functions (supplied via cable 26 to player 10 and via cable 28 to processor 16) include, illustratively, control of the radial position, elevation, velocity and direction of movement of pickup transducer 14 relative to disc 12 and squelching or muting of the audio and video signals produced by processor 16. Some of the functions are initiated manually by means of a player control switch unit 30 coupled to an input port of controller 24. Manually initiated functions include, illustratively, play, pause, slow scan forward or reverse, rapid scan forward or reverse and caption display enable. Upon closure of one of the user activated switches in unit 30, controller 24 addresses its internal read only memory (ROM) and fetches an appropriate sequence of instructions resident in the memory for effecting the desired control function. For example, in the pause or rapid scan modes, controller 24 supplies a stylus lift signal via conductor 26 to player 10 and a squelch signal to processor 16 via conductor 28. The stylus lift signal activates a stylus lifter solenoid in player 10 which lifts the stylus in transducer 14 from record 12 to avoid unnecessary wear. The squelch signal inhibits or mutes the audio and video output signals of processor 16 to prevent noise produced when the stylus is in its lifted position from reaching modulator 18.

Information display functions of controller 24 include processing of a data signal S3 recovered from disc 12 to provide a caption video output signal S4 and generation of a video blanking signal S5 for controlling the position of video switch 22 as will be explained subsequently.

The signal S3 is a binary coded signal including a start code, an error check code and an information code including field and band numbers and is recorded on disc 12 in the form of pulse code modulation (PCM) of the luminance signal level during a selected line (e.g., line 17) of the vertical interval of each video field. The signal S3 is recovered from disc 12 by means of a PCM detector in processor 16 and supplied to an information buffer 34 which includes error checking circuits which determine the validity of each recovered data word. If a data word is received without error, buffer 34 supplies a data status signal to controller 24 which then processes the data word to generate the caption data signal S4.

A suitable implementation of the PCM detector in processor 16 is described in C. B. Dieterich's U.S. Pat. No. 4,275,416 entitled "PCM DETECTOR" which issued June 23, 1981. Information buffer 34 and controller 24 may be of the kind described in Dieterich's U.S. patent application Ser. No. 084,393 filed Oct. 12, 1979, entitled "VIDEO DISC SYSTEM" which issued Dec. 29, 1981, as U.S. Pat. No. 4,308,557. Other U.S. patent aplications relating to methods of verifying the validity of the data, data framing, data recording, calculation of playing time from received data and transducer control include: "VIDEO DISC PLAYER SYSTEM FOR CORRELATING STYLUS POSITION WITH INFORMATION PREVIOUSLY DETECTED FROM DISC", U.S. Ser. No. 084,392 filed Oct. 12, 1979 by M. J. Mindel and J. C. Rustman which issued Dec. 22, 1981, as U.S. Pat. No. 4,307,418; "DIGITAL ON VIDEO RECORDING AND PLAYBACK SYSTEM", U.S. Pat. No. 4,419,699 which issued Dec. 6, 1983, as a continuation of "IMPROVED DIGITAL ON VIDEO RECORDING AND PLAYBACK SYSTEM", U.S. Ser. No. 084,465 filed Oct. 12, 1979 by T. J. Christopher and C. B. Dieterich; "IMPROVED ERROR CODING FOR VIDEO DISC SYSTEM", U.S. Ser. No. 084,396 filed Oct. 12, 1979 by T. J. Christopher which issued Jan. 5, 1982, as U.S. Pat. No. 4,309,721; and "TRACK ERROR CORRECTION SYSTEM AS FOR VIDEO DISC PLAYER", U.S. Ser. No. 084,386 filed Oct. 12, 1979 by J. C. Rustman and M. J. Mindel which issued Jan. 26, 1982, as U.S. Pat. No. 4,313,134.

The caption display data signal S4 produced by controller 24 may comprise messages such as video field or band numbers or other messages indicative of the operating status of the player and is supplied via data bus 25 to a display character generator 36 in response to activation of a user activated display on-off control switch in switch unit 30. Generator 36 converts the caption data signal to a caption video signal S6 of raster scan dot matrix form and provides a character background signal S7 for enhancing the visibility of displayed characters. A timing unit 38, coupled to receive the composite video signal S2, provides line rate (FH) and field rate (FV) synchronizing signals to generator 36 to synchronize the caption and background signals with the composite video signal S2.

The caption video signal is applied to pole "S" of video switch 22 via a low pass filter 50 which limits the caption video signal bandwidth and imparts a characteristic delay to the bandwidth limited signal. Preferably, filter 50 is of a class that provides a substantially constant delay through the major portion of its pass band. This has the advantage of minimizing distortion (particularly overshoot and ringing) of the character dots which comprise the caption video signal, thereby ensuring that the dots will exhibit uniform levels of brightness when displayed on a receiver or monitor. Low pass Gaussian filter networks (among others) have such a constant delay property and for higher ordered networks the constant delay property extends into the network stop band. It has been found that a three pole low pass Gaussian filter network having a corner frequency of about 1.5 MHz and a characteristic delay of about 175 nano-seconds is a suitable choice for use in video player applications where the luminance signal bandwidth is on the order of 3 MHz and in which the character dots or pixels are on the order of 350 nano-seconds wide.

The purpose of limiting the bandwidth of signal S6 is to prevent harmonics of the caption video signal from causing cross color or "color beat" effects in the chrominance signal of a television receiver used to display the captioned output signal of the player. As is known, in the NTSC television standard the color subcarrier has a frequency of approximately 3.58 MHz. The subcarrier and the chroma information carried thereon may be separated from a composite video signal in a receiver by means such as a high pass, bandpass or comb filter.

Since the caption video signal produced at the output of generator 36 is essentially of a rectangular waveform, it will most likely include harmonics falling within the NTSC chrominance band. This does not present a problem where the caption generator is located in a television receiver because, as is conventional practice, the caption video signal is multiplexed for display with the picture luminance signal on the receiver kinescope subsequent to color separation and other processing of the received signal.

However, as previously noted, in video disc or tape player applications, the caption and picture video signals are combined and remodulated on an RF carrier wave for application to the receiver. For this reason, the corner frequency (1.5 MHz) of low pass filter 50 is selected to be sufficiently less than the color subcarrier frequency (3.58 MHz) to facilitate color separation in the receiver, thereby preventing the character dot component of the video disc (or tape) player output signal from interfering with subsequent color processing in the television receiver.

The character background signal S7 produced by generator 36 is applied to a character background extender logic circuit 60 which extends the background signal for a predetermined time subsequent to each occurrence thereof. The predetermined time corresponds to a multiple of the characteristic delay of filter 50. A preferred multiple is two. The resultant extended background signal S8 is logically combined in an OR gate 70 for controlling the position of switch 22.

In operation, consider first the case where a user activates a "pause" switch in unit 30. When this occurs, controller 24 will: (1) supply a control signal to transducer 14 for stopping its radial tracking motion and lifting its stylus from disc 12; (2) supply the squelch signal SQ to processor 16 for muting the audio and video output signals S1 and S2, respectively; and (3) supply the video blanking signal S5 to switch 22 via OR gate 70 for placing and continuously maintaining switch 22 in position "S". If during this "pause" operating mode, the user also activates the "display enable" switch in unit 30, then controller 24 will supply caption data signals via data bus 25 to character generator 36. Illustratively, the signal S4 may represent the playing time of disc 12 or the number of the last video field when the pause switch was activated and/or some other suitable message. The caption video signal S6 will be coupled via switch 22 to modulator 18 for display on the receiver assumed to be connected to terminal 20 during the pause operating mode. The signal S7 may be ignored in this mode as gate 70 will be continuously enabled by signal S5.

In order to maintain synchronization of the receiver vertical and horizontal drive circuits with the caption video signal in this operating mode (pause), timing signals FH and FV produced by timing unit 38 or by some other suitable source are added to the bandwidth limited caption video signal by means of an adder 80. Preferably, adder 80 is interposed in the path between filter 50 and switch 22 as shown. The path between generator 36 and filter 50 is a less satisfactory location for adder 80 since the filter would tend to smooth the timing signals. The path between switch 22 and modulator 18 will be a suitable location for adder 80 if suitable means were provided for disabling adder 80 during the "play" operating mode of the player to avoid the possibility of the player output signal simultaneously including timing components of both the composite video signal and the contribution of adder 80. The illustrated location of adder 80 avoids such a possibility because in the play mode switch 22 is in position "S" only when the background signal S8 is present and this occurs during the active video portion of the composite video signal S2 and not during the horizontal or vertical synchronizing pulse periods.

Assume now that the user activates a "play" switch in unit 30. In response to this, controller 24 will: (1) supply a control signal to transducer 14 for lowering the pickup stylus and enabling the transducer radial servo system to resume radial tracking to recover signals from disc 12; (2) terminate the squelch signal supplied to processor 16 and (3) terminate the video blanking signal supplied to OR gate 70. Controller 24, assumed to have previously received a display enable signal from switch unit 30, will then update the playing time data signal S4 supplied to generator 36 as disc 12 plays. Video switch 22, controlled now by the extended background signal S8, will operate to combine the composite video signal S2 with the bandwidth limited caption video signal in interleaved fashion for application to modulator 18. Adder 80 may be ignored in this mode since switch 22 is not in position "S" when signals FH and FV are present.

Details of the operation of switch 22 and the effects of bandwidth limiting of signal S6 and extension of signal S7 will now be discussed with reference to the five signal waveforms A–E of FIG. 2. These waveforms illustrate the case where a two pixel wide character dot is to be displayed with an equal width black border on each side of the dot on one line scan of the raster. The principles of the invention apply generally to character generators which produce bordering or shading type of background signals and those which provide background "boxes" of rectangular form around the character.

Waveform A represents a timing signal having a period of two pixels of the caption video signal S6 (waveform C). As seen by comparison of waveforms B and C, the background signal S7 is symmetrically disposed about the center of the caption video signal at the output of generator 36. Waveform D illustrates the effect of low pass filtering of the signal S6. As seen, the character dot is smoothed and is delayed by ½ pixel so that it is no longer centered with respect to the background signal S7. If signal S7 were applied directly to switch 22 the resultant displayed character dot would appear to have unequal black borders. Waveform E illustrates the effect of adding a one pixel extension (shaded) to waveform B. As seen, the extended background signal S8 of waveform E is symmetrically disposed about the filtered caption video signal of waveform D.

The character background extender logic circuit of FIG. 3 comprises a pair of NOR logic gates 302 and 304 cross coupled to form a bistable or latching circuit and an inverter 306 coupled to the output of gate 302. The background signal S7 is applied to an input of gate 302 and the extended background signal is obtained from the output of inverter 306. A timing signal (e.g., waveform A, FIG. 2) proportional to the dot clock frequency of generator 36 is applied to an input of gate 304. In operation, a high or logic "1" level of the signal S7 will cause gate 302 to produce a low OR logic "0" level output signal regardless of the state of the timing signal. Since the timing signal is low at the time S7 makes a high to low transition the circuit will assume a latched condition with the output of gate 302 maintained in a low condition until a subsequent transition to a high level of the timing signal. Inverter 306 inverts the signal at the output of gate 302 thereby providing an output signal having a trailing edge extended as indicated by waveform E of FIG. 2.

What is claimed is:

1. A video player for providing an RF output signal for reception by a television receiver, comprising:
   signal recovery means for providing a composite video signal of a given bandwidth;
   character generator means for providing caption video signal having a bandwidth greater than said given bandwidth and a caption background signal;
   low pass filter means coupled to said generator means for limiting the bandwidth of said caption video signal to a predetermined value, said filter means having a characteristic delay;
   circuit means coupled to said generator means for extending said background signal for a predetermined time subsequent to each occurence thereof, said predetermined time corresponding to a multiple of said characteristic delay;
   switch means responsive to the extended background signal for combining the composite video signal with the bandwidth limited caption video signal in interleaved fashion to form a resultant signal;
   RF modulator means responsive to said resultant signal for providing a modulated radio frequency output signal on a selected television channel; and
   said bandwidth of said low pass filter means and the value of said predetermined time of said circuit means being selected so as to reduce visibility of cross color effects and effectively center the caption and background signals when captions are viewed on said television receiver.

2. A video player as recited in claim 1 wherein said multiple of said characteristic delay is greater than unity.

3. A video player as recited in claim 1 wherein said multiple of said characteristic delay is substantially equal to two.

4. A video player as recited in claim 1 wherein said caption signal is of dot matrix form and wherein said characteristic delay is substantially equal to one half of the time period of one character dot of said caption video signal.

5. A video player as recited in claim 4 wherein said predetermined time is substantially equal to the period of one character dot of said caption video signal.

6. A video player as recited in claim 1 wherein said filter means is of a filter class having a substantially constant delay characteristic.

7. A video disc player as recited in claim 6 wherein said filter means comprises a low pass Gaussian network.

8. A video player as recited in claim 1 wherein said circuit means comprises bistable means having a first input coupled to said character generator means, a second input for receiving a clock signal supplied thereto and an output for providing said extended background signal.

9. A video player as recited in claim 1 further comprising means for producing a video blanking signal in accordance with selected operating modes of said player and logic means for combining said video blanking signal with said extended background signal for application to said switch means.

* * * * *

UNITED STATES PATENT AND TRADEMARK OFFICE
CERTIFICATE OF CORRECTION

PATENT NO. : 4,477,841

DATED : October 16, 1984

INVENTOR(S) : Thomas Yuan-Ge Chen, et al.

It is certified that error appears in the above-identified patent and that said Letters Patent is hereby corrected as shown below:

Col. 8, Line 38 (Claim 7)

delete "disc"

Signed and Sealed this

Second Day of July 1985

[SEAL]

Attest:

DONALD J. QUIGG

Attesting Officer

Acting Commissioner of Patents and Trademarks